United States Patent
Nakayama et al.

(10) Patent No.: US 12,049,548 B2
(45) Date of Patent: Jul. 30, 2024

(54) PREPREG, LAYERED BODY, AND MOLDING

(71) Applicant: Toray Industries, Inc., Tokyo (JP)

(72) Inventors: Yoshihumi Nakayama, Ehime (JP); Miho Onodera, Ehime (JP); Masato Honma, Ehime (JP)

(73) Assignee: Toray Industries, Inc., Tokyo (JP)

( * ) Notice: Subject to any disclaimer, the term of this patent is extended or adjusted under 35 U.S.C. 154(b) by 52 days.

(21) Appl. No.: 17/606,859

(22) PCT Filed: May 15, 2020

(86) PCT No.: PCT/JP2020/019472
§ 371 (c)(1),
(2) Date: Oct. 27, 2021

(87) PCT Pub. No.: WO2020/235489
PCT Pub. Date: Nov. 26, 2020

(65) Prior Publication Data
US 2022/0204710 A1    Jun. 30, 2022

(30) Foreign Application Priority Data
May 23, 2019    (JP) .................................. 2019-097037

(51) Int. Cl.
*C08J 5/24* (2006.01)
*B29B 11/16* (2006.01)
(Continued)

(52) U.S. Cl.
CPC .............. *C08J 5/243* (2021.05); *B29B 11/16* (2013.01); *B29C 70/003* (2021.05);
(Continued)

(58) Field of Classification Search
CPC ....... C08J 5/243; C08J 2363/00; B29B 11/16; B32B 5/12; B32B 2260/046;
(Continued)

(56) References Cited

U.S. PATENT DOCUMENTS

| 5,126,146 A | 6/1992 | Seminoff et al. |
| 5,543,212 A | 8/1996 | Oosedo et al. |

(Continued)

FOREIGN PATENT DOCUMENTS

| CN | 108137836 A | 6/2018 |
| EP | 2047983 A1 | 4/2009 |

(Continued)

OTHER PUBLICATIONS

Polyetherimide, Wikipedia accessed online on Mar. 31, 2023.*

(Continued)

*Primary Examiner* — Camie S Thompson
(74) *Attorney, Agent, or Firm* — Buchanan Ingersoll & Rooney PC

(57) ABSTRACT

An object of the present invention is to provide a prepreg and a laminate for producing a laminate suitable as a structural material, which have excellent joining strength and can be firmly integrated with another structural member by welding. The present invention provides a prepreg including the following structural components: [A] reinforcing fibers, [B] a thermosetting resin, and [C] a thermoplastic resin, wherein [A] has a surface free energy, measured by a Wilhelmy method, of 10 to 50 mJ/m$^2$, [C] is present on a surface of the prepreg, and the reinforcing fibers [A] are present, which are included in a resin area including [B] and a resin area including [C] across an interface between the two resin areas.

30 Claims, 2 Drawing Sheets

(51) Int. Cl.
    *B29C 70/00*    (2006.01)
    *B29C 70/30*    (2006.01)
    *B29K 105/08*    (2006.01)
    *B32B 5/12*    (2006.01)
    *B32B 27/08*    (2006.01)
    *B32B 27/12*    (2006.01)
    *B32B 27/38*    (2006.01)

(52) U.S. Cl.
CPC .......... *B29C 70/0035* (2021.05); *B29C 70/30* (2013.01); *B32B 5/12* (2013.01); *B32B 27/08* (2013.01); *B32B 27/12* (2013.01); *B32B 27/38* (2013.01); *B29K 2105/0872* (2013.01); *B32B 2260/046* (2013.01); *B32B 2262/106* (2013.01); *C08J 2363/00* (2013.01)

(58) Field of Classification Search
CPC ............ B32B 2262/106; B29C 70/003; B29C 70/0035; B29C 70/30
USPC ................................ 428/297.4, 300.7, 292.1
See application file for complete search history.

(56) References Cited

U.S. PATENT DOCUMENTS

| | | | |
|---|---|---|---|
| 8,415,007 | B2 | 4/2013 | Honma et al. |
| 9,481,145 | B2 | 11/2016 | Hatanaka et al. |
| 9,683,326 | B2 | 6/2017 | Aral et al. |
| 9,963,576 | B2 | 5/2018 | Tsuchiya et al. |
| 10,047,478 | B2 | 8/2018 | Suzuki et al. |
| 10,668,647 | B2 | 6/2020 | Nguyen et al. |
| 2006/0110599 | A1* | 5/2006 | Honma .................. H05K 9/009 428/522 |
| 2015/0376353 | A1 | 12/2015 | Takebe et al. |

FOREIGN PATENT DOCUMENTS

| | | |
|---|---|---|
| EP | 2886590 A1 | 6/2015 |
| JP | 08259713 A | 10/1996 |
| JP | 10138354 A | 5/1998 |
| JP | 2004269878 | * 9/2004 |
| JP | 2004269878 A | 9/2004 |
| JP | 3906319 B2 | 4/2007 |
| JP | 2012246442 A | 12/2012 |
| JP | 2014043542 A | 3/2014 |
| JP | 2018161801 A | 10/2018 |
| WO | 2005082982 A1 | 9/2005 |
| WO | 2012124450 A1 | 9/2012 |
| WO | 2012133033 A1 | 10/2012 |
| WO | 2014017339 A1 | 1/2014 |

OTHER PUBLICATIONS

Chinese Office Action with Search Report for Chinese Application No. 202080036554.0, dated Feb. 16, 2023. 10 pages.
Extended European Search Report for EP Application No. 20810421.6, dated May 22, 2023, 7 pages.

* cited by examiner

PREPREG, LAYERED BODY, AND MOLDING

CROSS REFERENCE TO RELATED APPLICATIONS

This is the U.S. National Phase application of PCT/JP2020/019472, filed May 15, 2020 which claims priority to Japanese Patent Application No. 2019-097037, filed May 23, 2019, the disclosures of each of these applications being incorporated herein by reference in their entireties for all purposes.

FIELD OF THE INVENTION

The present invention relates to a prepreg including reinforcing fibers, a thermosetting resin, and a thermoplastic resin; a laminate including reinforcing fibers, a thermoplastic resin, and a cured product of a thermosetting resin; and a molding.

BACKGROUND OF THE INVENTION

Fiber-reinforced composite materials in which a thermosetting resin or a thermoplastic resin is used as a matrix and combined with reinforcing fibers such as carbon fibers or glass fibers are lightweight and have excellent dynamic characteristics such as strength and rigidity, heat resistance, and corrosion resistance, and therefore have been applied to many fields such as aerospace, automobiles, railway vehicles, ships, civil engineering and construction, and sporting goods. These fiber-reinforced composite materials, however, are unsuitable for producing parts or structures having a complicated shape in a single molding process, and in the above applications, it is necessary to produce a member including a fiber-reinforced composite material and then to integrate the member with the same or different kind of member. Mechanical joining methods using bolts, rivets, or screws, and joining methods using an adhesive are used as a method for integrating the fiber-reinforced composite material including the reinforcing fibers and the thermosetting resin with the same or different kind of member. The mechanical joining method has disadvantages in which a production process is prolonged and a production cost is increased because a process in which a joint is previously processed, such as drilling, is necessary, and the strength of the material is deteriorated because of the drilling. The joining method using the adhesive has disadvantages in which the production process is prolonged because the method requires a bonding process including preparation of an adhesive and coating of the adhesive, and a curing process, and the sufficient reliability in bonding strength cannot be obtained.

To the fiber-reinforced composite material using the thermoplastic resin as the matrix can be applied a method for joining members by welding, in addition to the mechanical joining method and the joining method using the adhesive described above, and thus the time required for joining the members may possibly be shortened. On the other hand, when the dynamic characteristics at a high temperature and excellent chemical resistance are required as in structural members for aircrafts, there is a problem of insufficient heat resistance and chemical resistance as compared with the fiber-reinforced composite material including the thermosetting resin and the reinforcing fibers.

Here, Patent Document 1 shows a method for joining a fiber-reinforced composite material including a thermosetting resin and reinforcing fibers through an adhesive.

Patent Document 2 shows a method for integrating a member formed from a thermoplastic resin with a member formed from a fiber-reinforced composite material including a thermosetting resin. That is, a thermoplastic resin film is laminated on a surface of a prepreg sheet including the reinforcing fibers and the thermosetting resin, and heated and pressurized to obtain a fiber-reinforced composite material. Thereafter, the obtained fiber-reinforced composite material is put in a mold, a thermoplastic resin is injection-molded, and the thermoplastic resin member, formed by the injection molding, is joined to the fiber-reinforced composite material.

In addition, Patent Document 3 shows a method for producing a laminate in which a thermoplastic resin adhesive layer is formed on a surface of a composite material including a thermosetting resin and reinforcing fibers, and describes that the laminate exhibits an adhesion effect with another member through the thermoplastic resin.

Patent Document 4 shows a prepreg including reinforcing fibers and a thermosetting resin, and having particles, fibers, or films including a thermoplastic resin disposed on a surface layer of the prepreg, and a fiber-reinforced composite material thereof.

PATENT DOCUMENTS

Patent Document 1: Japanese Patent Laid-Open Publication No. 2018-161801
Patent Document 2: Japanese Patent Laid-Open Publication No. 10-138354
Patent Document 3: Japanese Patent No. 3906319
Patent Document 4: Japanese Patent Laid-Open Publication No. 8-259713

SUMMARY OF THE INVENTION

The method disclosed in Patent Document 1, however, is a method for joining the fiber-reinforced composite materials including the reinforcing fibers and the thermosetting resin to each other using the adhesive, and welding cannot be applied to the method for joining the fiber-reinforced composite materials as they are, because the thermosetting resin is used as a matrix resin. There is a problem of the joining process needing time because the curing of the adhesive needs time, and further, the joining strength exhibited is insufficient.

According to the method described in Patent Document 2, the joining strength is insufficient at the joint between the thermosetting resin and the thermoplastic resin film in the fiber-reinforced composite material.

The fiber-reinforced composite material according to Patent Document 3 can be integrated by welding through a thermoplastic resin, and exhibits excellent joining strength, but has the insufficient joining strength in the application to structural members.

Patent Document 4 shows that interlaminar fractural toughness values are improved by the particles, fibers or films including the thermoplastic resin, but according to this method, the joining strength is insufficient at a boundary between the thermosetting resin and the thermoplastic resin in the fiber-reinforced composite material.

Therefore, an object of the present invention is to provide a prepreg, a laminate, and an integrated molding, which can be joined to the same or different kind of member by welding, have excellent joining strength, and provide a laminate suitable as a structural material.

In order to solve such problems, the prepreg according to an embodiment of the present invention has the following constitutions.

That is, it is a prepreg including the following structural components [A], [B], and [C], wherein [A] has a surface free energy, measured by a Wilhelmy method, of 10 to 50 mJ/m$^2$, [C] is present in a surface of the prepreg, and the reinforcing fibers [A] are present, which are included in a resin area including [B] and a resin area including [C] across an interface between the two resin areas:

[A] reinforcing fibers;
[B] a thermosetting resin; and
[C] a thermoplastic resin.

Furthermore, the laminate according to embodiments of the present invention is a laminate having the following configuration.

That is, it is a laminate including a layer including the following structural components [A], [C], and [D], in which [A] has a surface free energy, measured by a Wilhelmy method, of 10 to 50 mJ/m$^2$, and the reinforcing fibers [A] are present, which are included in a resin area including [C] and a resin area including [D] across an interface between the two resin areas:

[A] reinforcing fibers;
[C] a thermoplastic resin; and
[D] a cured product of a thermosetting resin.

The prepreg of the present invention uses the thermosetting resin and the thermoplastic resin and the resins are firmly joined to each other, and the prepreg can be favorably welded to the same or different kind of member, and thus, the time required for the joining process can be shortened and the molding speed of the structural members can be increased, as compared with a conventional fiber-reinforced composite material including a thermosetting resin and reinforcing fibers. Further, the prepreg exhibits the excellent joining strength, and thus a laminate excellent as a structural material can be obtained. The laminate of the present invention exhibits excellent performance as a structural body when it is applied to aircraft structural members, blades of a windmill, automobile structural members, and computer applications such as IC trays and housings of laptop computers, and the use of the prepreg of the present invention makes it possible to greatly reduce the molding time and molding cost of the product concerning the applications described above.

DETAILED DESCRIPTION OF EMBODIMENTS OF THE INVENTION

Figure 1:
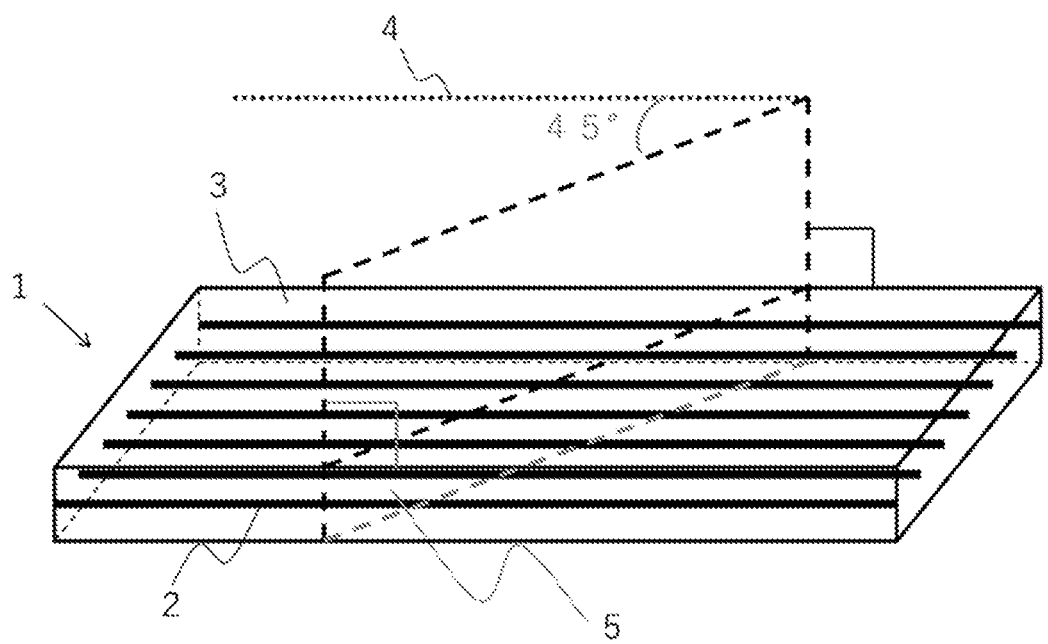
FIG. 1 is a schematic view showing a prepreg or a laminate according to an embodiment of the present invention, and showing a cross-section vertical to a prepreg plane or a laminate plane in FIG. 2.

The reinforcing fibers, the structural component [A], used in the present invention, may include glass fibers, carbon fibers, metal fibers, aromatic polyamide fibers, polyaramid fibers, alumina fibers, silicon carbide fibers, boron fibers, basalt fibers, and the like. They may be used alone or in combination of 2 or more, as appropriate. The reinforcing fibers may be subjected to a surface treatment. The surface treatment may include a metal deposition treatment, a treatment using a coupling agent, a treatment using a sizing agent, an additive deposition treatment, and the like. The reinforcing fibers may include reinforcing fibers having conductivity. As the reinforcing fibers, the carbon fibers are preferably used because of the low specific gravity, high strength, and high elastic modulus.

The form and arrangement of the reinforcing fibers can be appropriately selected from forms or arrangements in which the reinforcing fibers are arranged in one direction, laminates of products in which the reinforcing fibers are arranged in one direction, and woven fabrics, and the like, and in order to obtain a laminate which is lightweight and has a higher level of durability, it is preferable that the reinforcing fibers are in a form of a continuous fiber, such as long fibers (fiber bundles) of the reinforcing fibers arranged in one direction or a woven fabric, in each prepreg.

The reinforcing fiber bundle may be composed of a plurality of fibers in the same form, or may be composed of a plurality of fibers in the different forms. The number of the reinforcing fibers forming one reinforcing fiber bundle is usually 300 to 60,000, and is preferably 300 to 48,000, more preferably 1,000 to 24,000 in consideration of production of a base material. The range may be a combination of any of the above upper limits and any of the lower limits, described above.

It is preferable that that reinforcing fibers [A] have a strand tensile strength, measured in accordance with the resin-impregnated strand test method in JIS R7608 (2007), of 3.5 GPa or more, because a laminate having excellent joining strength in addition to the tensile strength can be obtained. The strand tensile strength is more preferably 5.0 GPa. The joining strength as used herein refers to a tensile shear joining strength determined in accordance with ISO 4587: 1995 (JIS K6850 (1994)).

The reinforcing fibers [A] used in the production of the prepreg or laminate according to embodiments of the present invention have a surface free energy, measured by a Wilhelmy method, of 10 to 50 mJ/m$^2$. When it is controlled within this range, the reinforcing fibers [A] exhibit high affinity with the thermosetting resin [B] and the thermoplastic resin [C], and exhibit high joining strength at the interface between the thermosetting resin [B] and the thermoplastic resin [C] at which the reinforcing fibers [A] are present across the interface. It is preferable that the reinforcing fibers [A] have a surface free energy of 10 to 40 mJ/m$^2$, more preferably 20 to 40 mJ/m$^2$. When it is less than 10 mJ/m$^2$, the affinity of the reinforcing fibers [A] with the thermosetting resin [B] or the thermoplastic resin [C] is decreased, and the joining strength is insufficient. When it is more than 50 mJ/m$^2$, the reinforcing fibers [A] are aggregated with each other to cause poor dispersion in the molding, leading to increased variation in the joining strength.

A method for controlling the surface free energy of the reinforcing fibers [A] may include a controlling method in which the surface is subjected to an oxidation treatment to adjust the number of oxygen-containing functional groups such as carboxyl groups and hydroxyl groups, and a controlling method in which monomers or a plurality of compounds are attached to the surface. When a plurality of compounds are attached to the surface, a mixture of a compound having a high surface free energy and a compound having a low surface free energy may be attached.

Examples of such a compound may include polyhydric alcohol fatty acid ester, polyoxyalkylene, bisphenol A-alkylene oxide adduct, sorbitol type polyglycidyl ether, glycerol type polyglycidyl ether, polyethylene glycol diglycidyl ether, glycidyl benzamide, amide-modified epoxy, urea-modified epoxy, glycidyl phthalimide, urethane-modified epoxy, and amine-based compounds such as polyethyleneimine and polyallylamine, which are used alone or in combination.

Hereinafter, a method for calculating the surface free energy of the reinforcing fibers [A] will be described.

The surface free energy can be calculated by measuring contact angles of the reinforcing fibers [A] to three kinds of solvents (purified water, ethylene glycol, and tricresyl phosphate), and then calculating using an Owens approximation formula. The procedures will be described below, but measuring instruments and detailed methods are not necessarily limited to the following.

First, one single fiber is taken out from a reinforcing fiber bundle using DCAT11 manufactured by DataPhysics Corporation, it is cut into 8 pieces having a length of 12±2 mm, and then they are pasted to a special holder FH12 (a flat plate whose surface is coated with an adhesive substance) in parallel with a gap between the single fibers of 2 to 3 mm. Thereafter, the tips of the single fibers are cut to the same size, and are set in the DCAT11 of the holder. In the measurement, a cell containing each solvent is brought close to the lower ends of the 8 monofilaments at a speed of 0.2 mm/s, and the monofilaments are immersed up to 5 mm from the tip thereof. Thereafter, the single fiber is pulled up at a speed of 0.2 mm/s. This operation is repeated four or more times. The force F from which the single fiber is received is measured in a state in which the fiber is immersed in the liquid using an electronic balance. Using this value, a contact angle θ is calculated by the following equation:

COS θ=(force $F$ (mN) from which the eight monofilaments are received)/((8 (the number of monofilaments)×circumference of monofilaments (m)×a surface tension of the solvent (mJ/m$^2$))

in which the measurement was performed on monofilaments extracted from three different positions of the reinforcing fiber bundle. That is, with respect to one reinforcing fiber bundle, the average value of the contact angles of 24, in total, of monofilaments is determined.

The surface free energy $\gamma_f$ of the reinforcing fiber is calculated as the sum of a polar component $\gamma^p_f$ of the surface free energy and a nonpolar component $\gamma^d_f$ of the surface free energy.

The polar component $\gamma^p_f$ of the surface free energy can be obtained by substituting a component and a contact angle of each liquid into an Owens approximation formula (a formula constituted by a polar component and a nonpolar component of a unique surface tension of each solvent, and a contact angle θ), as shown below, and plotting on X and Y, and then squaring a gradient a obtained by performing a collinear approximation by a method of least squares. The nonpolar component $\gamma^d_f$ of the surface free energy is obtained by squaring a slice b. The surface free energy $\gamma_f$ of the reinforcing fiber is the sum of the square of the gradient a and the square of the slice b.

$Y=a \cdot X+b$

X=√(a polar component of a surface tension of a solvent (mJ/m$^2$))/√(a nonpolar component of a surface tension of a solvent (mJ/m$^2$))

Y=(1+COS θse)·(a polar component of a surface tension of a solvent (mJ/m$^2$))/2 √(a nonpolar component of a surface tension of a solvent (mJ/m$^2$)

A polar component $\gamma^p_f$ of a surface free energy of a reinforcing fiber=a$^2$ A nonpolar component $\gamma^d_f$ of a surface free energy of a reinforcing fiber=b$^2$ A total surface free energy $\gamma_f$=a$^2$+b$^2$.

The polar component and the nonpolar component of the surface tension of each solvent are as follows:

Purified Water

Surface tension: 72.8 mJ/m$^2$, Polar component: 51.0 mJ/m$^2$, Nonpolar component: 21.8 (mJ/m$^2$)

Ethylene Glycol

Surface tension: 48.0 mJ/m$^2$, Polar component: 19.0 mJ/m$^2$, Nonpolar component: 29.0 (mJ/m$^2$)

Tricresol Phosphate

Surface tension: 40.9 mJ/m$^2$, Polar component: 1.7 mJ/m$^2$, Nonpolar component: 39.2 (mJ/m$^2$).

It is preferable that the compound (a) or the compound (b) is present on the surface of the reinforcing fiber [A] in the present invention.

Hereinafter, the compound (a) will be described.

The compound (a) has at least one functional group selected from the group consisting of an epoxy group, a hydroxyl group, a carboxyl group, and a urethane group in one molecule, and has 6 or more ether bonds in one molecule. It is preferable to have at least one functional group selected from the group consisting of a hydroxyl group, a carboxyl group, and a urethane group and two or more epoxy groups in one molecule.

The epoxy group, the hydroxyl group, the carboxyl group, and the urethane group form a covalent bond or a hydrogen bond with the oxygen-containing functional group (OH, COOH) on the surface of the reinforcing fiber [A], whereby the high affinity with the reinforcing fiber [A] is exhibited, and the formation of the covalent bond with the oxygen-containing functional group (OH, COOH) on the surface of the reinforcing fiber [A] is promoted because of the presence of two or more epoxy groups. In addition, these functional groups form a covalent bond or a hydrogen bond with the polar functional groups in the thermosetting resin [B] and the thermoplastic resin [C], and the high affinity is exhibited between the compound (a) and the thermosetting resin [B], or between the compound (a) and the thermoplastic resin [C].

In addition, the dispersibility of the reinforcing fibers [A] in the thermosetting resin [B] and the thermoplastic resin [C] across which the fibers are present is improved, because the compound (a) has 6 or more ether bonds in one molecule. As a result, it is possible to form the homogeneous interface without coarseness and denseness of the reinforcing fibers [A], the fracture, due to stress concentration in the thermosetting resin [B] or the thermoplastic resin [C], is suppressed, and the variation in the joining strength is reduced. It is preferable that the compound (a) has 15 or more ether bonds, because the dispersibility is further improved, and the variation in the joining strength is reduced.

The variation in the joining strength is expressed by a coefficient of variation, and refers to a value obtained by measuring the joining strength five times, calculating a standard deviation and an average value thereof, and dividing the standard deviation by the average value.

The compound (a) preferably has an epoxy equivalent of 100 to 400. When it is controlled to this range, the formation of the covalent bond between the oxygen-containing functional group (OH, COOH) on the surface of the reinforcing fiber [A] and the epoxy group is promoted, and thus the stronger interface is formed. In addition, the compound (a) forms a covalent bond or a hydrogen bond with the polar functional group in the thermosetting resin [B] or the thermoplastic resin [C], whereby the high affinity is exhibited between the compound (a) and the thermosetting resin [B], or between the compound (a) and the thermoplastic resin [C]. That is, the reinforcing fibers [A] exhibit the higher affinity with the thermosetting resin [B] and the thermoplastic resin [C] through the compound (a), and thus the high joining strength is exhibited at the interface between the thermosetting resin [B] or the thermoplastic resin [C] across which the reinforcing fibers [A] are present. The epoxy equivalent is more preferably within a range of 100 to 300.

In addition, the compound (a) is preferably an aliphatic compound. The aliphatic compound has a high molecular mobility, and can be arranged so that the interaction with the reinforcing fibers [A], the thermosetting resin [B], and the thermoplastic resin [C] is optimized, and thus the high affinity is exhibited.

The compound (a) preferably has a molecular weight of 500 to 1000. When it is controlled within this range, the molecular mobility is enhanced, and the arrangement can be performed so that the affinity of the reinforcing fibers [A] with the thermosetting resin [B] or the thermoplastic resin [C] is optimized, and thus the high affinity is exhibited.

That is, in any case described above, the high joining strength is exhibited at the interface between the thermosetting resin [B] and the thermoplastic resin [C] across which the reinforcing fibers [A] are present, because the reinforcing fibers [A] contribute to the exhibition of the higher affinity with the thermosetting resin [B] or the thermoplastic resin [C] through the compound (a). The molecular weight is more preferably within a range of 500 to 800.

The compound (a) is preferably at least one compound selected from the group consisting of polyhydric alcohol fatty acid esters, a polyoxyalkylenes, and bisphenol A-alkylene oxide adducts. When these compounds are present on the surface of the reinforcing fibers [A], the high joining strength is exhibited at the interface between the thermosetting resin [B] and the thermoplastic resin [C] across which the reinforcing fibers [A] are present, and the variation in the joining strength is reduced.

The polyhydric alcohol fatty acid ester is an ester including a polyhydric alcohol moiety and a fatty acid moiety, wherein glycerin, pentaerythritol, sorbitol, and sorbitan are preferably used as the polyhydric alcohol forming the ester. As the fatty acid forming the ester, saturated or unsaturated carboxylic acids having 12 to 22 carbon atoms and saturated or unsaturated hydroxycarboxylic acids having 12 to 22 carbon atoms are preferably used, and among them, hydrogenated ricinoleic acid (saturated) and ricinoleic acid (unsaturated) are particularly preferably used.

Among the polyhydric alcohol fatty acid esters, those in which ethylene oxide is added to a hydroxyl group derived from a polyhydric alcohol and/or a hydroxyl group derived from a hydroxycarboxylic acid are more preferable, and those in which the addition number of moles of the ethylene oxide is 10 to 200 are particularly preferable. It is more preferable that the addition number of moles is from 10 to 100, still more preferably from 10 to 50.

Specific examples of the polyoxyalkylene may include polyethylene oxide and polypropylene oxide.

In addition, the bisphenol A-alkylene oxide adduct is represented by the following general formulas (2) to (4), and when m+n in the formula is adjusted to 8 to 50, the dispersibility of the reinforcing fibers [A] in the thermosetting resin [B] and the thermoplastic resin [C] across which the fibers are present is improved. As a result, it is possible to form the homogeneous interface between the thermosetting resin [B] and the thermoplastic resin [C] without coarseness and denseness of the reinforcing fibers [A], the fracture due to stress concentration in the thermosetting resin [B] or the thermoplastic resin [C] is suppressed, and the variation in the joining strength is reduced. A more preferable range of m+n is 10 to 30. The range may be a combination of any of the above upper limits and any of the lower limits, described above.

[Chem. 1]

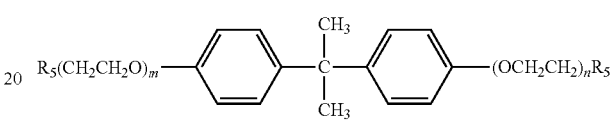

[Chem. 2]

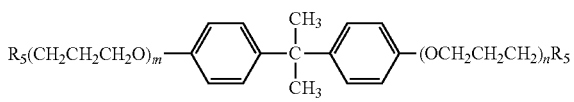

[Chem. 3]

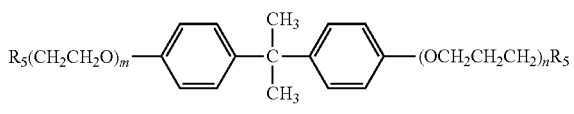

(In each general formula, $R_5$ is hydrogen or a hydroxyl group, and m+n is 8 to 50.)

As the other compound (a), sorbitol type polyglycidyl ethers, glycerol type polyglycidyl ethers, polyethylene glycol diglycidyl ethers, amide-modified epoxy resins, urethane-modified epoxy, and the like, are preferably used.

Hereinafter, the compound (b) will be described.

The compound (b) is an amine compound having the following general formula (1).

[Chem. 4]

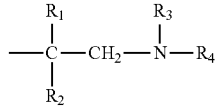

$R_1$ to $R_4$ each represent hydrogen or a hydrocarbon group having 1 to 22 carbon atoms, and a hydrogen group in the hydrocarbon group may be substituted by a hydroxyl group, and, for example, a hydrogen group (H) in a $CH_2$ group in the hydrocarbon group may be substituted by a hydroxyl group. Alternatively, the $CH_2$ group in the hydrocarbon group may be substituted by —O—, —O—CO—, —CO—O—, or an aminoalkylene group.

The compound (b) represented by the above formula (1) may include polyamine, compounds in which a part of an amine on a side chain of the polyallylamine is converted into a hydrochloride, and the like. Examples thereof may include polyamines such as polyethyleneimine, polypropyleneimine, polybutyleneimine, N-acetylpolyethyleneimine, N-propionylpolyethyleneimine, 1,1-dimethylethyleneimine, 1,1-dimethyl-2-methylethyleneimine, 1,1-dimethyl-2-propylethyleneimine, N-butyrylpolyethyleneimine, N-valerylpolyethyleneimine, N-hexanoylpolyethyleneimine, N-stearoylpolyethyleneimine, and polybenzaldomine, derivatives thereof, mixtures thereof, modified or copolymerized polyimine resins, and the like. Among them, polyallylamine and polyethyleneimine are particularly preferable.

The compound (b) preferably has an amine value of 5 to 30 mmol/g in terms of the affinity of the reinforcing fibers [A] with the thermosetting resin [B] or the thermoplastic resin [C]. It is more preferable that the amine value is within a range of 10 to 30 mmol/g, more preferably 15 to 30 mmol. The range may be a combination of any of the above upper limits and any of the lower limits, described above. The amine value is an index showing the total amount of 1, 2, and tertiary amines, measured in accordance with ASTM D2074 (2013), and shows the number of moles of KOH required for neutralizing 1 g of the compound (b).

The prepreg of the present invention preferably has an amount of the reinforcing fibers per unit area of 30 to 2,000 g/m². When the amount of the reinforcing fibers is 30 g/m² or more, the number of layers can be reduced for obtaining a predetermined thickness in the molding of the laminate, and the operation tends to be simple. On the other hand, when the amount of the reinforcing fibers is 2,000 g/m² or less, the drapability of the prepreg is easily improved.

The mass content of the reinforcing fibers in the prepreg of the present invention is preferably 30 to 90% by mass, more preferably 35 to 85% by mass, still more preferably 40 to 80% by mass. The range may be a combination of any of the above upper limits and any of the lower limits, described above. When the mass content of the reinforcing fibers is 30% by mass or more, the amount of the resin is not excessively large relative to the amount of the fibers, and it is easy to obtain the advantage of the laminate having the excellent specific strength and specific elastic modulus, and a calorific value is hardly excessively increased at the time of curing during the molding of the laminate. When the mass content of the reinforcing fibers is 90% by mass or less, poor impregnation of the resin is unlikely to occur, and voids in the resulting laminate are likely to be reduced.

The reinforcing fibers [A] have preferably an interfacial shear strength of 21 MPa or more with the epoxy resin, because a laminate having the excellent joining strength can be obtained. It is more preferable that the interfacial shear strength is within a range of 25 to 40 MPa.

Hereinafter, a method for measuring the interfacial shear strength will be described. The interfacial shear strength (IFSS) was measured according to the following procedures (i) to (iv).

(i) Preparation of Epoxy Resin

Into a container were put 100 parts by mass of a bisphenol A type epoxy resin compound "jER" (registered trademark) 828 (manufactured by Mitsubishi Chemical Corporation) and 14.5 parts by mass of meta-phenylenediamine (manufactured by Sigma-Aldrich Japan). Thereafter, in order to decrease the viscosity of jER828 and dissolve meta-phenylenediamine, the mixture was heated at a temperature of 75° C. for 15 minutes, then was well mixed, and the resulting mixture was subjected to a vacuum defoaming at a temperature of 80° C. for about 15 minutes.

(ii) Fixing of Reinforcing Fiber Single Yarn on Special Mold

A monofilament was pulled out from a reinforcing fiber bundle, and both ends of the monofilament were fixed with an adhesive in a longitudinal direction of a dumbbell-shaped mold while a constant tension was applied to the monofilament. Thereafter, in order to remove moisture adhering to the reinforcing fiber and the mold, vacuum drying was performed at a temperature of 80° C. for 30 minutes or more. The dumbbell-shaped mold is made of silicone rubber, and a cast portion thereof has a shape in which the center part is 5 mm in width and 25 mm in length, the both ends are 10 mm in width, and the overall length is 150 mm.

(iii) Resin Casting and Curing

The resin prepared in the procedure (i) was poured into the dumbbell-shaped mold, which had been vacuum dried in the procedure (ii), and the temperature was raised to 75° C. at a temperature-raising rate of 1.5° C./min in an oven, it was held at 75° C. for 2 hours, then the temperature was raised to 125° C. at a temperature-raising rate of 1.5 minutes, it was held at 125° C. for 2 hours, and the temperature was lowered to 30° C. at a temperature-lowering rate of 2.5° C./min. Thereafter, a test peace was obtained by demolding.

(iv) Measurement of Interfacial Shear Strength (IFSS)

After a tensile force was applied to the test piece, obtained in the procedure (iii), in a fiber axis direction (longitudinal direction) to generate 12% strain, the number N of fractured fibers was measured using a polarizing microscope in a range of 22 mm at the center of the test piece. Next, the average fractural fiber length la was calculated by the formula la (μm)=22×1000 (μm)/N (fractured fibers), and the critical fiber length lc was calculated from the average fractural fiber length la by the formula lc (μm)=(4/3)×la (μm). The strand tensile strength σ and the diameter d of the carbon fiber monofilament were measured, and the interfacial shear strength IFSS was calculated by the following formula. In Examples, the average of the number of measurements n=5 was used as the test result.

Interfacial shear strength IFSS (MPa)=σ (MPa)×$d$ (μm)/(2×$lc$) (μm).

The thermosetting resin used for the structural component [B] used in the present invention may include, for example, unsaturated polyester resins, vinyl ester resins, epoxy resins, phenol resins, urea resins, melamine resins, polyimide resins, cyanate ester resins, bismaleimide resins, benzoxazine resins, copolymers and modified products thereof, and resins obtained by blending at least two of these resins. In order to improve the impact resistance, an elastomer or a rubber component may be added to the thermosetting resin. Among them, an epoxy resin is preferable because it is excellent in dynamic characteristics, heat resistance, and adhesiveness to the reinforcing fibers.

The main agent of the epoxy resin may include, for example, bisphenol type epoxy resins such as bisphenol A type epoxy resin, bisphenol F type epoxy resin, bisphenol AD type epoxy resin, and bisphenol S type epoxy resin, brominated epoxy resins such as tetrabromobisphenol A diglycidyl ether, epoxy resins having a biphenyl backbone, epoxy resins having a naphthalene backbone, epoxy resins having a dicyclopentadiene backbone, novolac type epoxy resins such as phenol novolac type epoxy resin and cresol novolac type epoxy resin, N,N,O-triglycidyl-m-aminophenol, glycidyl amine type epoxy resins such as N,N,O-triglycidyl-p-aminophenol, N,N,O-triglycidyl-4-amino-3-methylphenol, N,N,N',N'-tetraglycidyl-4,4'-methylenedianiline, N,N,N',N'-tetraglycidyl-2,2'-diethyl-4, 4'-methylenedianiline, N,N,N',N'-tetraglycidyl-m-xylylenediamine, N,N-diglycidylaniline, and N,N-diglycidyl-o-toluidine, resorcinyl glycidyl ethers, triglycidyl isocyanurates, and the like.

The thermosetting resin [B] preferably includes an epoxy resin, a thermosetting resin including a glycidyl amine type epoxy resin having 3 or more glycidyl groups in an amount of 40 to 100 parts by mass based on 100 parts by mass of the all epoxy resins is a more preferable aspect, because a cured product having the high heat resistance can be obtained. The glycidyl amine type epoxy resin having 3 or more glycidyl groups may include, for example, N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-methylenedianiline, N,N,N',N'-tetraglycidyl-2,2'-diethyl-4,4'-methylenedianiline, and N,N,N',N'-tetraglycidyl-m-xylylenediamine.

The curing agent of the epoxy resin may include, for example, dicyandiamides, aromatic amine compounds, phenol novolac resins, cresol novolac resins, polyphenol compounds, imidazole derivatives, tetramethylguanidine, thiourea-added amines, carboxylic acid hydrazides, carboxylic acid amides, polymercaptans, and the like.

In particular, when an aromatic amine curing agent is used as the curing agent of the epoxy resin, a cured product of the epoxy resin having the good heat resistance can be obtained. The aromatic amine compound may include, for example, 3,3'-diisopropyl-4,4'-diaminodiphenyl sulfone, 3,3'-di-t-butyl-4,4'-diaminodiphenyl sulfone, 3,3'-diethyl-5,5'-dimethyl-4,4'-diaminodiphenyl sulfone, 3,3'-diisopropyl-5,5'-dimethyl-4,4'-diaminodiphenyl sulfone, 3,3'-di-t-butyl-5,5'-dimethyl-4,4'-diaminodiphenyl sulfone, 3,3',5,5'-tetraethyl-4,4'-diaminodiphenyl sulfone, 3,3'-diisopropyl-5,5'-diethyl-4,4'-diaminodiphenyl sulfone, 3,3'-di-t-butyl-5,5'-diethyl-4,4'-diaminodiphenyl sulfone, 3,3',5,5'-tetraisopropyl-4,4'-diaminodiphenyl sulfone, 3,3'-di-t-butyl-5,5'-diisopropyl-4,4'-diaminodiphenyl sulfone, 3,3',5,5'-tetra-t-butyl-4,4'-diaminodiphenyl sulfone, 4,4'-diaminodiphenyl sulfone, 3,3'-diaminodiphenyl sulfone, and the like.

Furthermore, it is preferable that the thermosetting resin [B] includes a thermoplastic resin component soluble in a thermosetting resin composition as a viscosity modifier in a dissolved state. Such a thermoplastic resin component is different from the thermoplastic resin [C], and is another thermoplastic resin component. When such a component is included, the affinity between the thermosetting resin [B] and the thermoplastic resin [C] is improved, and the joining strength, obtained when the laminate is joined to a member through the thermoplastic resin [C], is improved. Here, the phrase "soluble in a thermosetting resin composition" refers to a state in which when a mixture of a thermoplastic resin component and a thermosetting resin composition is heated or stirred while heating, there is a temperature region in which the mixture is in a uniform phase. Here, "in a uniform phase" refers to a state in which separation is not observed visually. Here, the "dissolved state" refers to a state in which when the temperature of the thermosetting resin composition including the thermoplastic resin component is adjusted to a certain region, a uniform phase is formed. Once the uniform phase is formed in the certain temperature range, there is no problem even if the separation may occur at a temperature other than the temperature range, for example, at room temperature.

The thermoplastic resin component soluble in the thermosetting resin [B] is generally preferably a thermoplastic resin having a bond selected from the group consisting of a carbon-carbon bond, an amide bond, an imide bond, an ester bond, an ether bond, a carbonate bond, a urethane bond, a thioether bond, a sulfone bond, and a carbonyl bond in the main chain. In addition, the thermoplastic resin component may partially have a crosslinked structure, and may be crystalline or may be amorphous. In particular, a resin is preferable which is at least one resin selected from the group consisting of polyamide, polycarbonate, polyacetal, polyphenylene oxide, polyphenylene sulfide, polyarylate, polyester, polyamideimide, polyimide, polyetherimide, polyimide having a phenyltrimethylindane structure, polysulfone, polyethersulfone, polyetherketone, polyetheretherketone, polyaramid, polyvinyl formal, polyvinyl butyral, phenoxy resin, polyethernitrile, and polybenzimidazole.

The cured product of the thermosetting resin, the structural component [D], in the present invention, can be obtained by thermally curing the thermosetting resin [B]. The determination of cure of the cured product [D] of the thermosetting resin included in the laminate can be performed in a manner in which when the laminate is subjected to a differential scanning calorimetry at a temperature-rising rate of 10° C./min in an inert gas atmosphere, if an area of a peak appearing as an exothermic reaction (residual heat generation) is 50 J/g or less, it can be determined that the laminate is substantially a cured product. Alternatively, when the thermosetting resin composition before curing can be specified, the degree of cure is obtained by the following formula, and if the value is 90% or more, it may be determined that the resulting laminate is a cured product.

Degree of cure (%)=((a calorific value of the composition including the thermosetting resin before curing)−(a calorific value of the cured product of the thermosetting resin))/(a calorific value of the composition including the thermosetting resin before curing)×100.

When the prepreg according to embodiments of the present invention is used, the thermosetting resin corresponds to the structural component [B]. The laminate of the present invention does not necessarily pass through the prepreg, and may be produced by a resin transfer molding method described below, or the like.

The thermoplastic resin forming the structural component [C] is not particularly limited, and examples thereof may include polyester-based resins (polyethylene terephthalate, polybutylene terephthalate, polytrimethylene terephthalate, polyethylene naphthalate, liquid crystal polyester, and the like), polyolefin-based resins (polyethylene, polypropylene, polybutylene, and the like), styrene-based resins, urethane resins, polyoxymethylene, polyamide-based resins (aliphatic polyamides such as polyamide 6 and polyamide 66, semi-aromatic polyamides, alicyclic polyamides, and the like), polycarbonate, polymethyl methacrylate, polyvinyl chloride, polyphenylene sulfide, polyphenylene ether, modified polyphenylene ether, polyimide, polyamide imide, polyetherimide, polysulfone, modified polysulfone, polyether sulfone, polyketone, polyarylene ether ketone (polyether ketone, polyether ether ketone, polyether ketone ketone, and the like), polyarylate, polyether nitrile, phenol-based resins, phenoxy resins, and the like. In addition, these thermoplastic resins may be copolymers or modified products of the resins described above, and/or resins obtained by blending two or more kinds thereof. In order to improve the impact resistance, an elastomer or a rubber component may be added to the thermosetting resin or the thermoplastic resin. Furthermore, the thermosetting resin or the thermoplastic resin may appropriately include other fillers or additives as long as the object of the present invention is not impaired depending on the use. Examples thereof may include inorganic fillers, flame retardants, conductivity imparting agents, crystal nucleating agents, ultraviolet absorbers, antioxidants, damping agents, antibacterial agents, insect repellents, deodorants, coloring inhibitors, heat stabilizers, mold release agents, antistatic agents, plasticizers, lubricants, coloring agents, pigments, dyes, foaming agents, antifoaming agents, coupling agents, and the like.

In the prepreg according to embodiments of the present invention, the reinforcing fibers [A] are present, which are included in a resin area including the thermosetting resin [B] and a resin area including the thermoplastic resin [C] across an interface between the two resin areas.

The presence of the reinforcing fibers [A] included in the two resin areas across the interface between the two resin areas can be confirmed by observing a cross-section obtained by cutting the prepreg vertically to the planar direction. One example is shown with reference to FIG. 2. In the observation image 9 of FIG. 2, in the prepreg, the resin area 7 including the thermoplastic resin [C] closely adheres to the resin area 8 including the thermosetting resin [B], and a surface at which the resin area 7 including the thermoplastic resin [C] closely adheres to the resin area 8 including the thermosetting resin [B] is illustrated as an interface 10. In addition, a plurality of reinforcing fibers [A] 6 are present on the interface 10. The reinforcing fibers [A] 6 on the interface 10 are brought into contact with both of the resin area 7 including the thermoplastic resin [C] and the resin area 8 including the thermosetting resin [B]. The state in which the thermoplastic resin [C] and the thermosetting resin [B] are brought into contact with each other around the reinforcing fibers, as described above, can refer to a state in which the reinforcing fibers [A] are included in the two resin areas across the interface.

Furthermore, when the prepreg according to embodiments of the present invention is viewed in planar view, in a cross-section vertical to a plane of the prepreg including the reinforcing fibers [A], present across the interface between the two resin areas, from a direction of an angle different by 45 degrees, either clockwise or counterclockwise, to the direction of any reinforcing fiber [A] included in the two resins, i.e., in a cross-section obtained by cutting the prepreg vertically to the prepreg plane direction, it is preferable that a cross-sectional curve, formed by the interface between the two resins, has an average roughness length RSm, defined in accordance with JIS B0601 (2001), of 100 μm or less, and an average roughness height Rc of 3.5 μm or more.

Figure 2:
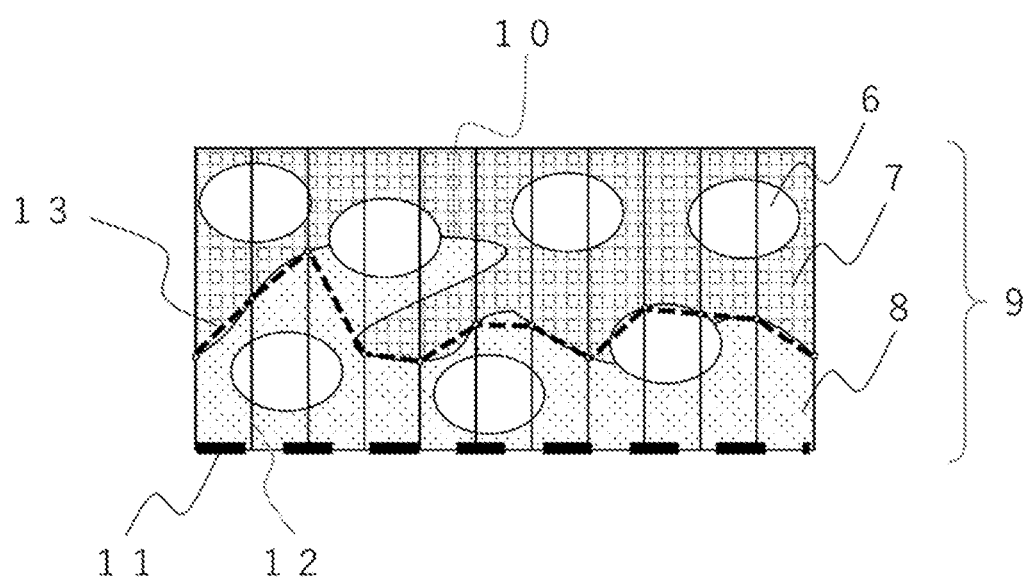
FIG. 2 is a schematic view showing a cross-section vertical to a prepreg plane or a laminate plane in an embodiment of the present invention, and helps to explain a method for measuring an average roughness length RSm and an average roughness height Rc.

In addition, it is preferable that the resin area including the thermosetting resin [B] and the resin area including the thermoplastic resin [C] are adjacent to each other in a layered state to form the interface. The phrase "adjacent to each other in a layered state" refers to a state in which the two continuous resin areas are present adjacent to each other, as shown in FIG. 2 as an example, and it can be confirmed by observing a cross-section obtained by cutting the prepreg vertically to the prepreg plane direction.

When the presence of the reinforcing fibers [A] included in the resin area including the thermosetting resin [B] and the resin area including the thermoplastic resin [C] across the interface between the two resin areas improves the strength of the resin area including the thermoplastic resin [C] and improves the joining strength. The reinforcing fibers [A], present on the interface, are chemically and/or physically bonded to the thermosetting resin [B] and the thermoplastic resin [C], whereby the adhesive force between the resin area including the thermosetting resin [B] and the resin area including the thermoplastic resin [C] is improved. It is enough that the number of reinforcing fibers [A], present on the interface, is 1 or more, and though the upper limit number is not particularly limited, it is 200 in an observation range described below.

When the prepreg is viewed in planar view, i.e., it is viewed vertically to the prepreg plane direction, the interface between the resin area including the thermosetting resin [B] and the resin area including the thermoplastic resin [C] is observed in a cross-section vertical to a prepreg plane including the reinforcing fibers [A], present across the two resin areas, from a direction of an angle different by 45 degrees, either clockwise or counterclockwise, to the direction of any reinforcing fiber [A] included in the two resin areas. It is possible to simultaneously evaluate the adhesive force in the fiber axis direction and the direction vertical thereto by observing the aspect of the resin area at the interface in such a cross-section.

In such a cross-sectional observation, it is preferable that the cross-sectional curve, formed by the interface, has an average roughness length RSm, defined in JIS B0601 (2001), of 100 μm or less, because it is less likely to be peeled off the resin area including the thermosetting resin [B] and the resin area including the thermoplastic resin [C] from each other due to not only a chemical or/and physical bonding force but also a mechanical bonding force of entanglement. The lower limit thereof is not particularly limited, and is preferably 15 μm or more for avoiding decrease in the mechanical bonding force due to stress concentration. In addition, it is preferable that the cross-sectional curve has an average roughness height Rc of is 3.5 μm or more, because not only the mechanical bonding force is exhibited by the entanglement but also but also the reinforcing fibers [A], present on the interface, are chemically and/or physically bonded to the thermosetting resin [B] and the thermoplastic resin [C], thus resulting in the improvement of the adhesive force between the resin area including the thermosetting resin [B] and the resin area including the thermoplastic resin [C]. The average roughness height Rc of the cross-sectional curve is more preferably within a range of 10 μm or more, because the reinforcing fibers [A] are easily included in the two resin areas and thus the adhesive force is further improved, particularly preferably 20 μm. The upper limit is not particularly limited, and is preferably 100 μm or less for avoiding decrease in the mechanical bonding force due to stress concentration.

Here, as a method for measuring the average roughness height Rc and the average roughness length RSm of the cross-sectional curve, a known method can be used. Examples thereof may include a method in which after the thermosetting resin [B] is cured, measurement is performed from a cross-sectional image, obtained using an X-ray CT, a method in which measurement is performed from an elemental analysis mapping image by using an energy dispersive X-ray spectrometer (EDS), and a method in which measurement is performed from a cross-sectional observation image by using an optical microscope, a scanning electron microscope (SEM), or a transmission electron microscope (TEM). In the observation, the thermosetting resin [B] and/or the thermoplastic resin [C] may be dyed in order to adjust the contrast. In the image obtained by any of the above methods, the average roughness height Rc and the average roughness length RSm of the cross-sectional curve are measured in a range of 500 μm square.

One example of the method for measuring the average roughness height Rc and the average roughness length RSm of the cross-sectional curve (method 1 for measuring a cross-sectional curve element) is shown with reference to FIG. 2. Vertical baselines 12 are drawn at an interval of 5 μm from the resin area 8 including the thermosetting resin [B] toward the resin area 7 including the thermoplastic resin [C], the end 11 on the resin area including the thermosetting resin [B] in the rectangular observation image 9 being defined as a baseline. Points at which the vertical baseline drawn from the baseline intersects the thermoplastic resin [C] for the first time are plotted, and a line connecting the plotted points is defined as a cross-sectional curve 13. The obtained cross-sectional curve 13 is subjected to a filtering processing based on JIS B0601 (2001), and the average roughness height Rc and the average roughness length RSm of the cross-sectional curve 13 are calculated.

In addition, it is preferable that the resin area including the thermosetting resin [B] and the resin area including the thermoplastic resin [C] are adjacent to each other in a layered state to form the interface, because the excellent dynamic characteristics can be exhibited.

In the prepreg of the present invention, it is preferable that the thermoplastic resin [C] has a basis weight of 10 g/m$^2$ or more. It is preferably 10 g/m$^2$ or more, because a sufficient thickness for exhibiting the excellent joining strength is obtained. The basis weight is more preferably 20 g/m$^2$. The upper limit is not particularly limited, and is preferably 500 g/m$^2$ or less, because the amount of the thermoplastic resin is not excessively large as compared to the amount of the reinforcing fibers, and a laminate having the excellent specific strength and specific elastic modulus can be obtained. Here, the basis weight refers to a mass (g) of the thermoplastic resin [C] included per 1 m$^2$ of the prepreg.

The prepreg of the present invention preferably has an amount of the reinforcing fibers [A] per unit area of 30 to 2,000 g/m$^2$. When the amount of the reinforcing fibers is 30 g/m$^2$ or more, the number of layers can be reduced for obtaining a predetermined thickness in the molding of the laminate, and the operation tends to be simple. On the other hand, when the amount of the reinforcing fibers is 2,000 g/m$^2$ or less, the drapability of the prepreg is easily improved.

The mass content of reinforcing fibers [A] in the prepreg of the present invention is preferably 30 to 90% by mass, more preferably 35 to 85% by mass, still more preferably 40 to 80% by mass. The range may be a combination of any of the above upper limits and any of the lower limits, described above. When the mass content of the reinforcing fibers is 30% by mass or more, the amount of the resin is not excessively large relative to the amount of the fibers, and it is easy to obtain the advantage of the laminate having the excellent specific strength and specific elastic modulus, and a calorific value is hardly excessively increased at the time of curing during the molding of the laminate. When the mass content of the reinforcing fibers is 90% by mass or less, poor impregnation of the resin is unlikely to occur, and voids in the resulting laminate are likely to be reduced.

The laminate according to embodiments of the present invention satisfies the following forms. It includes the structural components [A], [C], and [D], wherein [A] has a surface free energy, measured by a Wilhelmy method, of 10 to 50 mJ/m$^2$, and the reinforcing fibers [A] are present, which are included in a resin area including [C] and a resin area including [D] across an interface between the two resin areas.

The presence of the reinforcing fibers [A] included in the two resin areas across the interface between the two resin areas can be confirmed by observing a cross-section obtained by cutting the laminate vertically to the planar direction of the laminate, similarly to the confirmation method in the prepreg described above.

One example is shown with reference to FIG. 2. In the observation image 9 of FIG. 2, in the laminate, the resin area 7 including the thermoplastic resin [C] closely adheres to the resin area 8 including the cured product [D] of the thermosetting resin, and a surface at which the resin area 7 including the thermoplastic resin [C] and the resin area 8 including the cured product [D] of the thermosetting resin closely adhere to each other is illustrated as an interface 10. In addition, a plurality of reinforcing fibers [A] 6 are present on the interface 10. The reinforcing fibers [A] 6 on the interface 10 are brought into contact with both of the resin area 7 including the thermoplastic resin [C] and the resin area 8 including the cured product [D] of the thermosetting resin. The state in which the thermoplastic resin [C] and the cured product [D] of the thermosetting resin are brought into contact with each other around the reinforcing fiber, as described above, can refer to a state in which the reinforcing fibers are "included in the two resin areas across the interface".

Furthermore, when the laminate according to embodiments of the present invention is viewed in planar view, in a cross-section vertical to a plane of the laminate including the reinforcing fibers [A], present across the two resin areas, at an angle of 45 degrees in a viewpoint vertical to the plane direction of the laminate, either clockwise or counterclockwise, to the direction of any reinforcing fiber [A] included in the two resin areas, i.e., in a cross-section to be observed, obtained by cutting the laminate vertically to the laminate plane direction, it is preferable that a cross-sectional curve, formed by the interface between the two resin areas closely adhering to each other, has an average roughness length RSm, defined by JIS B0601 (2001), of 100 μm or less, and an average roughness height Rc of 3.5 μm or more. The average roughness height Rc is more preferably 10 μm or more. The lower limit value of RSm and the upper limit value of Rc are not particularly limited, and RSm is preferably 15 μm or more and Rc is preferably 100 μm or less in terms of concern of reduction in mechanical bonding force due to stress concentration. As a method for measuring the average roughness height Rc and the average roughness length RSm of the cross-sectional curve, the same method as in the measuring method in the prepreg of the present invention, as described above, can be employed.

It is preferable that the resin area including the thermoplastic resin [C] and the resin area including the cured product [D] of the thermosetting resin are adjacent to each other in a layered state to form the interface, because the excellent dynamic characteristics can be exhibited. The phrase adjacent in a layered state refers to a state in which the two continuous resin areas are present adjacent to each other, as illustrated in FIG. 2 as an example, and it can be confirmed by observing a cross-section obtained by cutting the laminate vertically to the laminate planar direction.

The method for molding the laminate of the present invention may include, for example, molding methods such as a press molding method, an autoclave molding method, a bagging molding method, a wrapping tape method, an internal pressure molding method, a hand lay-up method, a filament winding method, a pultrusion method, a resin injection molding method, and a resin transfer molding method.

The laminate of the present invention can be produced by a method in which the prepreg according to embodiments of the present invention described above is laminated alone or together with another prepreg to form a product in which the prepreg of the invention forms at least a part of the layers, and the laminate is cured by pressurization and heating.

Here, as the method for applying heat and pressure, for example, a press molding method, an autoclave molding method, a bagging molding method, a wrapping tape method, an internal pressure molding method, or the like, is adopted.

In the laminate according to embodiments of the present invention, there is the thermoplastic resin [C] on the surface or between layers. It is preferable that the thermoplastic resin [C] is present both on the surface and between the layers. When the thermoplastic resin [C] is present on the surface of the laminate, the laminate of the present invention can be joined to the same or different kind of member through the thermoplastic resin [C] by welding; on the other hand, when the thermoplastic resin [C] is present between the layers in the laminate, the excellent interlaminar fractural toughness values ($G_{IC}$ and $G_{IIC}$) are obtained.

The laminate of the present invention can be integrated (welded) with another member (adherend), which is the same and/or different kind of member forming the laminate, through the thermoplastic resin [C] present on the surface of the laminate, by joining the member to the thermoplastic resin [C] by some kind of heating means. The different kind of member (adherend) may include members including a thermoplastic resin and members including a metal material. The member including the thermoplastic resin may include reinforcing fibers, fillers, and the like. The integration method is not particularly limited, and may include, for example, thermal welding, vibration welding, ultrasonic welding, laser welding, resistance welding, induction welding, insert injection molding, outsert injection molding, and the like.

The strength of the joint of the integrated member can be evaluated based on ISO 4587: 1995 (JIS K6850 (1994)).

The laminate of the present invention is preferably used in aircraft structural members, wind turbine blades, automobile external plates, computer applications such as IC trays and housings of laptop computers, and sports applications such as golf shafts and tennis rackets.

EXAMPLES

Hereinafter, the present invention will be described in more detail with reference to Examples. However, the scope of the present invention is not limited to these Examples. The unit "part" of the composition ratio means part by mass unless otherwise noted. In addition, measurements of various characteristics were performed under an environment in which a temperature was 23° C. and a relative humidity was 50% unless otherwise noted.

Materials used in Examples and Comparative Examples are shown below.

<Structural Component [A]>
A-1: An acrylonitrile copolymer copolymerized with itaconic acid was spun and fired to obtain carbon fiber bundles having a total number of filaments of 12,000, a total fineness of 800 texes, a specific gravity of 1.8, a strand tensile strength of 5.1 GPa, and a strand tensile elastic modulus of 240 GPa. Next, the carbon fiber bundles were subjected to an electrolytic surface treatment using an ammonium hydrogen carbonate aqueous solution having a concentration of 0.1 mol/liter as an electrolytic solution with an electric quantity of 120 coulombs per 1 g of the carbon fiber bundles. The carbon fiber bundles, subjected to the electrolytic surface treatment, were subsequently washed with water and dried in heated air at a temperature of 150° C. to obtain a carbon fiber bundles (A-1) as a starting material. The obtained carbon fiber had a surface oxygen concentration O/C of 0.18.

The surface oxygen concentration O/C of the carbon fiber can be determined by an X-ray photoelectron spectroscopy according to the following procedures. First, the carbon fibers, from which dirt and the like adhering to the surface of the carbon fibers has been removed with a solvent, are cut into 20 mm, they are spread and arranged on a copper sample support, and AlKα1 and AlKα2 are used as an X-ray source and the inside of the sample chamber is kept at $1 \times 10^{-8}$ Torr. A binding energy value of the main peak (peak top) of $C_{1s}$ is adjusted to 284.6 eV as a correction value of a peak associated with charging during the measurement. A $C_{1s}$ peak area is determined by drawing a straight baseline in a range of 282 to 296 eV. An $O_{1s}$ peak area is determined by drawing a straight baseline in a range of 528 to 540 eV. Here, the surface oxygen concentration can be calculated as an atomic ratio from a ratio between the $O_{1s}$ peak area and the $C_{1s}$ peak area using a sensitivity correction value special to an apparatus.

<Compound (a)>
a-1: Sorbitol polyglycidyl ether (EX614B, manufactured by Nagase ChemteX Corporation)
a-2: Diglycerol polyglycidyl ether (EX421, manufactured by Nagase ChemteX Corporation)
a-3: Polyglycerol polyglycidyl ether (EX521, manufactured by Nagase ChemteX Corporation)
a-4: Polyethylene glycol diglycidyl ether (Number of ethylene oxides: 13, manufactured by Nagase ChemteX Corporation)
a-5: Bisphenol A-ethylene oxide 15 mol adduct
a-6: Bisphenol A-propylene oxide 24 mol adduct.

<Compound (b)>
b-1: PO-modified polyethyleneimine (PP061, manufactured by Nippon Shokubai Co., Ltd.)
b-2: Polyallylamine (PAA-01, manufactured by Nippon Shokubai Co., Ltd.)
b-3: Polyethyleneimine (SP-012, manufactured by Nippon Shokubai Co., Ltd.)

<Other Compounds>
Ethylene glycol diglycidyl ether (EX-810, manufactured by Nagase ChemteX Corporation)
Bisphenol A type diglycidyl ether (jER828, manufactured by Mitsubishi Chemical Corporation).

<Method for Adhering Compound (a) or (b), or Another Compound to Structural Component [A]>

Each compound was mixed with acetone to obtain a solution having the compound uniformly dissolved in a concentration of about 1% by mass. Each compound was applied to the reinforcing fiber [A] by an immersion method, and then it was subjected to a heat-treatment at 210° C. for 90 seconds. The deposition amount of each compound was adjusted to 0.5 parts by mass based on 100 parts by mass of the reinforcing fiber [A] to which the compound adhered.

<Structural Component [B]>
B-1: To a kneader mixer were put 50 parts by mass of a bisphenol A type epoxy resin ("jER" (registered trademark) 825 (manufactured by Mitsubishi Chemical Corporation)), 50 parts by mass of tetraglycidyl diaminodiphenylmethane ("SUMI-EPDXY (registered trademark)" ELM434 (manufactured by Sumitomo Chemical Co., Ltd.)), and 8 parts by mass of polyethersulfone ("SUMIKAEXCEL (registered trademark)" PES5003P (manufactured by Sumitomo Chemical Co., Ltd.)), and they were heated and kneaded to dissolve the polyethersulfone. Then, the temperature was lowered to 100° C. or lower while continuing the kneading, to which 45 parts by mass of 4,4'-diaminodiphenyl sulfone (SEIKACURE S (manufactured by Wakayama Seika Kogyo Co., Ltd.) was added, and the mixture was stirred to obtain a thermosetting resin composition.

<Structural Component [C]>

C-1: A film including polyamide 6 ("AMILAN" (registered trademark) CM 1007, melting point: 225° C., glass transition temperature: 48° C., manufactured by Toray Industries, Inc.), and having a basis weight of 120 g/m²

<Method for Producing and Evaluating Prepreg>

The prepreg was prepared by the following 2 methods. The structural components used in each Example are as shown in Table 1 and Table 2.

Prepreg [I]

While a reinforcing fiber sheet in which the reinforcing fibers [A] (basis weight: 193 g/m²) were aligned in one direction, was drawn and run in one direction, a resin sheet having a basis weight of 120 g/m², and including the thermoplastic resin [C] was put on the continuous reinforcing fiber sheet, it was heated by an IR heater to melt the thermoplastic resin [C], whereby the resin sheet was attached to the one entire surface of the continuous reinforcing fiber sheet, and the impregnated reinforcing fiber sheet was pressurized by nip rolls maintained at a melting point or lower of the thermoplastic resin [C] to cool it, thereby obtaining a fiber-reinforced resin intermediate. A thermosetting resin composition including the thermosetting resin [B] was coated on a release paper in a resin basis weight of 100 g/m² using a knife coater to produce a thermosetting resin film, and then the thermosetting resin film was overlaid on an opposite surface to the impregnation surface of the thermoplastic resin [C] of the intermediate, and the resulting sheet was heated and pressurized by heat rolls, whereby the thermosetting resin composition intermediate was impregnated to obtain a prepreg [I].

Prepreg [II]

A thermosetting resin composition including the thermosetting resin [B] was coated on a release paper in a resin basis weight of 50 g/m² using a knife coater to prepare a resin film. The resin films were overlaid on both sides of the reinforcing fibers [A] (bases weight: 193 g/m²) aligned in one direction, and the resulting sheet was heated and pressured using heat rolls to impregnate carbon fibers with the thermosetting resin composition, thereby obtaining a prepreg [II].

<Method for Producing Laminate and Evaluation of Dynamic Characteristics>

(1) Method for Measuring Tensile Shear Joining Strength

The prepregs [I] and [II], prepared above, were cut into a predetermined size to obtain two prepregs [I] and six prepregs [II]. The prepregs were laminated at [0°/90°]$_{2s}$, wherein an axial direction of the reinforcing fiber was defined as 0°, a direction orthogonal to the axial direction was defined as 90°, and the symbol s indicates mirror symmetry, to produce a preform. At that time, the lamination was performed so that the 2 outermost layers of the preform were the prepregs [I]. That is, the lamination was performed so that the 6 prepregs [II] were put between the 2 prepregs [I]. The arrangement was performed so that both surface layers of the preform were disposed to be the thermoplastic resin layers including the thermoplastic resin [C]. That is, the prepreg [I] was disposed so that the surface impregnated with the thermoplastic resin [C] of the prepreg [I] was on the outer side. This preform was set in a press molding die, and a pressure of 0.6 MPa was applied with a press machine while maintaining this shape using a jig or a spacer as necessary, and the preform was heated under the curing conditions of 180° C. for 2 hours to obtain a laminate. The existence position of the thermoplastic resin [C] was on the surface of the laminate.

The obtained laminate was cut into 2 sheets having sizes of a width of 250 mm and a length of 92.5 mm, in which the 0° direction is the length direction of the test piece, and dried in a vacuum oven for 24 hours. Thereafter, 2 cut panels having sizes of a width of 250 mm and a length of 92.5 mm, were overlaid on each other, with a width of 25 mm×a length of 12.5 mm in which the 0° direction was the length direction, a pressure of 3 MPa was applied thereto at a temperature 20° C. higher than the melting point of the thermoplastic resin, the structural component [C] used, and it was held for 1 minute to weld the overlaid surfaces, whereby an integrated molding was obtained. A tab was bonded to the obtained integrated molding in accordance with ISO 4587: 1995 (JIS K6850 (1994)), and it was cut into a width of 25 mm to obtain a desired test piece.

The obtained test piece was dried in a vacuum oven for 24 hours, and the tensile shear joining strength was measured at an environmental temperature of 23° C. based on ISO 4587 (JIS K6850 (1994)). The results are shown in Tables 1 and 2.

The coefficient of variation in the joining strength refers to a value obtained by measuring the joining strength five times, calculating a standard deviation and an average value thereof, and dividing the standard deviation by the average value.

<Measurement of Average Roughness Length RSm and Average Roughness Height Rc of Prepreg or Laminate>

The prepreg [I] or the laminate, as produced above, was used. As shown in FIG. 1, in the prepreg, an image of a cross-section 5 to be observed, cut vertically to the prepreg plane direction, was photographed at a magnification of 1000 using an optical microscope, in a planar view of the prepreg to the fiber direction 4 of any [A] included in the two resin areas, i.e., at an angle of 45 degrees in a viewpoint vertical to the prepreg plane direction. In an arbitrary observation range of 500 μm square in the obtained image, the average roughness length RSm and the average roughness height Rc, defined in JIS B0601 (2001) of the cross-sectional curve element obtained by the measurement method 1 of the cross-sectional curve element, were measured. The same applies to the laminate.

Example 1 and Comparative Example 1

In Example 1, as shown in Table 1, when ethylene glycol diglycidyl ether (EX-810, manufactured by Nagase ChemteX Corporation) was attached to the surface of the reinforcing fiber [A], the surface free energy of the reinforcing fiber [A] was 16.0 mJ/m². In Comparative Example 1, as shown in Table 1, when the bisphenol A type diglycidyl ether (jER828, manufactured by Mitsubishi Chemical Corporation) was attached to the surface of the reinforcing fiber [A], the surface free energy of the reinforcing fiber [A] was 9.0 mJ/m². In Example 1, the joining strength of the fiber-reinforced composite material was higher and the coefficient of variation in the joining strength was smaller than those in Comparative Example 1.

Comparative Example 2

In Comparative Example 2, a prepreg [III] was prepared and used by the following method instead of the prepreg [I].

While a reinforcing fiber sheet, in which the reinforcing fibers [A] (basis weight: 193 g/m²) were aligned in one direction, was drawn and run in one direction, resin sheets having a basis weight of 50 g/m² and including the thermosetting resin [B] were put on both surfaces of the continuous reinforcing fiber sheet, and it was heated by an IR heater and pressurized by nip rolls to obtain a fiber-reinforced resin intermediate. Here, the resin sheet was produced by coating the thermosetting resin [B] on a release paper in a resin basis weight of 50 g/m² using a knife coater. A resin sheet having a basis weight of 120 g/m² and including the thermoplastic resin [C] was put on the fiber-reinforced resin intermediate, the resulting sheet was heated with an IR heater to melt the thermoplastic resin [C] to attach it to one surface of the fiber-reinforced resin intermediate, and it was cooled and pressurized with nip rolls maintained at a melting point or lower of the thermoplastic resin [C] to impregnate into the thermosetting resin composition intermediate, thereby obtaining a prepreg [III].

The joining strength was measured in accordance with the (1) Method for Measuring Tensile Shear Joining Strength except that the prepreg [I] was changed to the prepreg [III].

In Comparative Example 2, as shown in Table 1, when ethylene glycol diglycidyl ether (EX-810, manufactured by Nagase ChemteX Corporation) was attached to the surface of the reinforcing fiber [A], the surface free energy of the reinforcing fiber [A] was 16.0 mJ/m². In Comparative Example 2, the joining strength of the fiber-reinforced composite material was low, and the coefficient of variation in the joining strength was large.

Example 2

In Example 2, as described in Table 1, the same procedures as in Example 1 were performed except that (a-1) was attached to the surface of the reinforcing fibers [A]. In Example 2, the joining strength of the fiber-reinforced composite material was higher and the coefficient of variation in the joining strength was smaller than those in Example 1.

Example 3

In Example 3, as described in Table 1, the same procedures as in Example 1 were performed except that (a-2) was attached to the surface of the reinforcing fibers [A]. In Example 3, the joining strength of the fiber-reinforced composite material was higher and the coefficient of variation in the joint strength was smaller than those in Example 1.

Example 4

In Example 4, as described in Table 1, the same procedures as in Example 1 were performed except that (a-3) was attached to the surface of the reinforcing fibers [A]. In Example 4, the joining strength of the fiber-reinforced composite material was higher and the coefficient of variation in the joining strength was smaller than those in Example 1.

Example 5

In Example 5, as described in Table 1, the same procedures as in Example 1 were performed except that (a-4) was attached to the surface of the reinforcing fibers [A]. In Example 5, the joining strength of the fiber-reinforced composite material was slightly higher and the coefficient of variation in the joining strength was smaller than those in Example 1.

Example 6

In Example 6, as shown in Table 2, the same procedures as in Example 1 were performed except that (a-5) was attached to the surface of the reinforcing fibers [A]. In Example 6, the joining strength of the fiber-reinforced composite material was slightly higher and the coefficient of variation in the joining strength was slightly smaller than those in Example 1.

Example 7

In Example 7, as shown in Table 2, the same procedures as in Example 1 were performed except that (a-6) was attached to the surface of the reinforcing fibers [A]. In Example 7, the joining strength of the fiber-reinforced composite material was equivalent to, and the coefficient of variation in the joining strength was slightly smaller than those in Example 1.

Example 8

In Example 8, as shown in Table 2, the same procedures as in Example 1 were performed except that (b-1) was attached to the surface of the reinforcing fibers [A]. In Example 8, the joining strength of the fiber-reinforced composite material was higher and the coefficient of variation in the joining strength was smaller than those in Comparative Example 1.

Example 9

In Example 9, as shown in Table 2, the same procedures as in Example 1 were performed except that (b-2) was attached to the surface of the reinforcing fibers [A]. In Example 9, the joining strength of the fiber-reinforced composite material was higher and the coefficient of variation in the joint strength was smaller than those in Example 8.

Example 10

In Example 10, as shown in Table 2, the same procedures as in Example 1 were performed except that (b-3) was attached to the surface of the reinforcing fibers [A]. In Example 10, the joining strength of the fiber-reinforced composite material was higher and the coefficient of variation in the joining strength was smaller than those in Example 8.

TABLE 1

|  | Comparative Example 1 | Comparative Example 2 | Example 1 | Example 2 | Example 3 | Example 4 | Example 5 |
|---|---|---|---|---|---|---|---|
| Structural component [A] | A-1 | A-1 | A-1 | A-1 | A-1 | A-1 | A-1 |
| Structural component [B] | B-1 | B-1 | B-1 | B-1 | B-1 | B-1 | B-1 |
| Structural component [C] | C-1 | C-1 | C-1 | C-1 | C-1 | C-1 | C-1 |

TABLE 1-continued

|  |  |  | Comparative Example 1 | Comparative Example 2 | Example 1 | Example 2 | Example 3 | Example 4 | Example 5 |
|---|---|---|---|---|---|---|---|---|---|
| Compound present on surface of structural component [A] |  |  | jER828 | EX810 | EX810 | a-1 | a-2 | a-3 | a-4 |
| Characteristics of compounds | Backbone |  | Aromatic | Aliphatic | Aliphatic | Aliphatic | Aliphatic | Aliphatic | Aliphatic |
|  | Molecular weight |  | 230 | 230 | 230 | 680 | 480 | 730 | 740 |
|  | Ether bond | Number | 4 | 4 | 4 | 8 | 7 | 10 or more | 16 |
|  | Functional group | Kind | Epoxy | Epoxy | Epoxy | Epoxy | Epoxy | Epoxy | Epoxy |
|  |  | Number | 2 | 2 | 2 | 4 or more | 3 | 4 or more | 2 |
|  |  | Epoxy equivalent (g/eq) | 184-194 | 113 | 113 | 173 | 159 | 183 | 372 |
|  | Amine value | mmol/g | — | — | — | — | — | — | — |
| Surface free energy of structural component [A] |  | mJ/m$^2$ | 9.0 | 16.0 | 16.0 | 32.0 | 22.0 | 28.0 | 20.0 |
| Average roughness length Rsm of prepreg and laminate |  | μm | 62 | 160 | 37 | 65 | 51 | 60 | 40 |
| Average roughness height Rc of prepreg and laminate |  | μm | 12 | 2 | 24 | 18 | 21 | 25 | 26 |
| Reinforcing fibers [A] included in two resin areas across interface |  |  | Presence | absence | Presence | Presence | Presence | Presence | Presence |
| State and arrangement of resin area including [B] or [D] and the resin area including [C] |  |  | Layered/ Adjacent | Layered/ Adjacent | Layered/ Adjacent | Layered/ Adjacent | Layered/ Adjacent | Layered/ Adjacent | Layered/ Adjacent |
| Position of structural component [C] |  |  | Surface | Surface | Surface | Surface | Surface | Surface | Surface |
| Interfacial shear strength between structural component [A] and epoxy resin |  | MPa | 20.0 | 23.0 | 23.0 | 32.0 | 26.5 | 28.0 | 24.0 |
| Tensile shear joining strength |  | MPa | 20.0 | 16.4 | 26.2 | 35.0 | 30.6 | 33.2 | 27.9 |
| Coefficient of variation in tensile shear joining strength (CV) |  | % | 10.0 | 18.0 | 8.4 | 5.1 | 5.8 | 3.5 | 5.1 |

TABLE 2

|  |  |  | Example 6 | Example 7 | Example 8 | Example 9 | Example 10 |
|---|---|---|---|---|---|---|---|
| Structural component [A] |  |  | A-1 | A-1 | A-1 | A-1 | A-1 |
| Structural component [B] |  |  | B-1 | B-1 | B-1 | B-1 | B-1 |
| Structural component [C] |  |  | C-1 | C-1 | C-1 | C-1 | C-1 |
| Compound present on surface of structural component [A] |  |  | a-5 | a-6 | b-1 | b-2 | b-3 |
| Characteristics of compounds | Backbone |  | Aromatic | Aromatic | Aliphatic | Aliphatic | Aliphatic |
|  | Molecular weight |  | 890 | 1280 | 1400 | 1600 | 1200 |
|  | Ether bond | Number | 15 | 24 | — | — | — |
|  | Functional group | Kind | Hydroxyl group | Hydroxyl group | Amine | Amine | Amine |
|  |  | Number | 2 | 2 | 2 or more | 2 or more | 2 or more |
|  |  | Epoxy equivalent (g/eq) | — | — | — | — | — |
|  | Amine value | mmol/g | — | — | 9.9 | — | 19 |
| Surface free energy of structural component [A] |  | mJ/m$^2$ | 19.0 | 18.0 | 18.0 | 32.0 | 33.0 |
| Average roughness length Rsm of prepreg and laminate |  | μm | 40 | 38 | 51 | 70 | 72 |
| Average roughness height Rc of prepreg and laminate |  | μm | 26 | 25 | 25 | 19 | 15 |
| Reinforcing fibers [A] included in two resin areas across interface |  |  | Presence | Presence | Presence | Presence | Presence |
| State and arrangement of resin area including [B] or [D] and the resin area including [C] |  |  | Layered/ Adjacent | Layered/ Adjacent | Layered/ Adjacent | Layered/ Adjacent | Layered/ Adjacent |
| Position of structural component [C] |  |  | Surface | Surface | Surface | Surface | Surface |
| Interfacial shear strength between structural component [A] and epoxy resin |  | MPa | 23.5 | 22.5 | 23.0 | 27.5 | 28.0 |
| Tensile shear joining strength |  | MPa | 27.1 | 26.2 | 26.2 | 32.4 | 33.2 |
| Coefficient of variation in tensile shear joining strength (CV) |  | % | 4.7 | 3.9 | 8.4 | 6.8 | 7.4 |

DESCRIPTION OF REFERENCE SIGNS

1: One layer forming prepreg or laminate
2: Structural component [A]
3: structural component [C] and structural component [B], or structural component [C] and structural component [D]
4: Axial direction of any fiber bundle
5: Cross-section to be observed
6: Structural component [A]
7: Resin area including structural component [C]
8: Resin area including structural component [B] or resin area including structural component [D]
9: Observation image
10: Interface
11: Baseline
12: Vertical baseline
13: Cross-sectional curve

The invention claimed is:

1. A prepreg comprising the following structural components [A], [B], and [C], wherein
[A] has a surface free energy, measured by a Wilhelmy method, of 10 to 50 mJ/m², 
[C] is present in a surface of the prepreg, and
the reinforcing fibers [A] are present, which are included in a resin area including [B] and resin area including [C] across an interface between the two resin areas:
[A] reinforcing fibers;
[B] a thermosetting resin; and
[C] a thermoplastic resin,
wherein, in a planar view of the prepreg, when a cross-section vertical to a prepreg plane including [A] is obtained from a direction of an angle different by 45 degrees to a direction of any fiber [A] included in the two resin areas, a cross-sectional curve, formed by the interface between the two resin areas closely adhering to each other, in the cross-section, has an average roughness length RSm, defined by JIS B0601 (2001), of 100 µm or less, and an average roughness height Rc of 3.5 µm or more.

2. The prepreg according to claim 1, wherein the resin area including [B] and the resin area including [C] are adjacent to each other in a layered state to form the interface.

3. The prepreg according to claim 1, wherein a compound (a) or a compound (b) is present on a surface of the structural component [A]:
(a) a compound having at least one functional group selected from the group consisting of an epoxy group, a hydroxyl group, a carboxyl group, and a urethane group and having 6 or more ether bonds in one molecule; and
(b) an amine compound having the following general formula (1):

[Chem. 1]

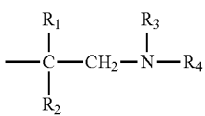

(1)

wherein $R_1$ to $R_4$ each represent hydrogen or a hydrocarbon group having 1 to 22 carbon atoms, the hydrogen group (H) in the hydrocarbon group is optionally substituted by a hydroxyl group, and the hydrocarbon group is optionally substituted by —O—, —O—CO—, —CO—O—, or an aminoalkylene group.

4. The prepreg according to claim 3, wherein the compound (a) has two or more epoxy groups and six or more ether bonds in one molecule.

5. The prepreg according to claim 3, wherein the compound (a) has 15 or more ether bonds in one molecule.

6. The prepreg according to claim 3, wherein the compound (a) has an epoxy equivalent of 100 to 400.

7. The prepreg according to claim 3, wherein the compound (a) is an aliphatic compound.

8. The prepreg according to claim 3, wherein the compound (a) is at least one compound selected from the group consisting of a polyhydric alcohol fatty acid ester, a polyoxyalkylene, and a bisphenol A-alkylene oxide adduct.

9. The prepreg according to claim 3, wherein the compound (a) has a molecular weight of 500 to 1000.

10. The prepreg according to claim 3, wherein the compound (b) has an amine value of 5 to 30 mmol/g.

11. The prepreg according to claim 1, wherein the structural component [A] is a carbon fiber.

12. The prepreg according to claim 1, wherein the structural component [A] has an interfacial shear strength of 21 MPa or more with an epoxy resin.

13. The prepreg according to claim 1, wherein the average roughness height Rc is 10 µm or more.

14. A laminate comprising a layer including the following structural components [A], [C], and [D], wherein
[A] has a surface free energy, measured by a Wilhelmy method, of 10 to 50 mJ/m², and
the reinforcing fibers [A] are present, which are included in a resin area including [C] and resin area including [D] across an interface between the two resin areas:
[A] reinforcing fibers;
[C] a thermoplastic resin; and
[D] a cured product of thermosetting resin,
wherein in a planar view of the laminate, when a cross-section vertical to a laminate plane including [A] is obtained from a direction of an angle different by 45 degrees to a direction of any fiber [A] included in the two resin areas, a cross-sectional curve, formed by the interface between the two resin areas closely adhering to each other, in the cross-section, has an average roughness length RSm, defined by JIS B0601 (2001), of 100 µm or less, and an average roughness height Rc of 3.5 µm or more.

15. The laminate according to claim 14, wherein the resin area including [C] and the resin area including [D] are adjacent to each other in a layered state to form the interface.

16. The laminate according to claim 14, wherein the structural component [C] is present on the surface.

17. The laminate according to claim 16, wherein a cured product of a prepreg forms at least a part of the layers, wherein the prepreg comprises the following structural components [A], [B], and [C], and wherein
[A] has a surface free energy, measured by a Wilhelmy method, of 10 to 50 mJ/m², 
[C] is present in a surface of the prepreg, and
the reinforcing fibers [A] are present, which are included in a resin area including [B] and resin area including [C] across an interface between the two resin areas:
[A] reinforcing fibers;
[B] a thermosetting resin; and
[C] a thermoplastic resin.

18. The laminate according to claim 17, wherein the resin area including [B] and the resin area including [C] are adjacent to each other in a layered state to form the interface.

19. The laminate according to claim 17, wherein the structural component [A] is a carbon fiber.

20. A molding comprising a laminate according to claim 16 which is integrated with another member by joining the member to a surface of a structural component [C].

21. The laminate according to claim 14, wherein a compound (a) or a compound (b) is present on the surface of the structural component [A]:
(a) a compound having at least one functional group selected from the group consisting of an epoxy group, a hydroxyl group, a carboxyl group, and a urethane group and having 6 or more ether bonds in one molecule; and
(b) an amine compound having the following general formula (1):

[Chem. 2]

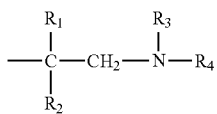
(1)

wherein $R_1$ to $R_4$ each represent hydrogen or a hydrocarbon group having 1 to 22 carbon atoms, the hydrogen group (H) in the hydrocarbon group is optionally substituted by a hydroxyl group, and the hydrocarbon group is optionally substituted by —O—, —O—CO—, —CO—O—, or an aminoalkylene group.

22. The laminate according to claim 21, wherein the compound (a) has two or more epoxy groups and 6 or more ether bonds in one molecule.

23. The laminate according to claim 21, wherein the compound (a) has 15 or more ether bonds in one molecule.

24. The laminate according to claim 21, wherein the compound (a) has an epoxy equivalent of 100 to 400.

25. The laminate according to claim 21, wherein the compound (a) is an aliphatic compound.

26. The laminate according to claim 21, wherein the compound (a) is at least one compound selected from the group consisting of a polyhydric alcohol fatty acid ester, a polyoxyalkylene, and a bisphenol A-alkylene oxide adduct.

27. The laminate according to any one of claim 21, wherein the compound (a) has a molecular weight of 500 to 1000.

28. The laminate according to claim 21, wherein the compound (b) has an amine value of 5 to 30 mmol/g.

29. The laminate according to claim 14, wherein the structural component [A] has an interfacial shear strength of 21 MPa or more with an epoxy resin.

30. The laminate according to claim 14, wherein the average roughness height Rc is 10 μm or more.

* * * * *

UNITED STATES PATENT AND TRADEMARK OFFICE
CERTIFICATE OF CORRECTION

| | | |
|---|---|---|
| PATENT NO. | : 12,049,548 B2 | |
| APPLICATION NO. | : 17/606859 | |
| DATED | : July 30, 2024 | |
| INVENTOR(S) | : Yoshihumi Nakayama, Miho Onodera and Masato Honma | |

It is certified that error appears in the above-identified patent and that said Letters Patent is hereby corrected as shown below:

In the Claims

Column 28, Claim 27 at Line 9: after "according to" delete "any one of".

Signed and Sealed this
Seventeenth Day of September, 2024

Katherine Kelly Vidal
*Director of the United States Patent and Trademark Office*